US012106309B2

(12) United States Patent
Joseph et al.

(10) Patent No.: US 12,106,309 B2
(45) Date of Patent: Oct. 1, 2024

(54) METHOD AND SYSTEM FOR FRAUD PREVENTION

(71) Applicant: JPMorgan Chase Bank, N.A., New York, NY (US)

(72) Inventors: Jerome Joseph, Lewis Center, OH (US); Siva Tanuku, Westerville, OH (US); Ramu Kizhakkey, Downingtown, PA (US); Kumar Rao Krishnagi, Powell, OH (US); Heidi Middleton, Westerville, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/960,323

(22) Filed: Oct. 5, 2022

(65) Prior Publication Data

US 2024/0119456 A1 Apr. 11, 2024

(51) Int. Cl.
*G06Q 20/40* (2012.01)
(52) U.S. Cl.
CPC .................. *G06Q 20/4016* (2013.01)
(58) Field of Classification Search
CPC ................................................. G06Q 20/4016
See application file for complete search history.

(56) References Cited

U.S. PATENT DOCUMENTS

| 9,530,129 | B2 * | 12/2016 | Lanc ............... G06Q 20/327 |
| 10,706,423 | B1 * | 7/2020 | Kuo ................... G06N 20/00 |
| 10,846,623 | B2 * | 11/2020 | Adjaoute ........... G06F 16/215 |
| 10,977,655 | B2 * | 4/2021 | Adjaoute ............ G06N 20/00 |
| 2011/0035288 | A1 * | 2/2011 | Clyne .................. G06Q 30/02 705/14.71 |
| 2011/0264567 | A1 * | 10/2011 | Clyne .................. G06Q 40/12 707/602 |
| 2016/0019545 | A1 * | 1/2016 | Vastenavondt ...... G06Q 20/227 705/44 |
| 2017/0193515 | A1 * | 7/2017 | Sharan ............... G06F 16/245 |
| 2017/0201779 | A1 * | 7/2017 | Publicover ......... H04N 21/4532 |
| 2021/0117977 | A1 * | 4/2021 | Kim ..................... G06F 18/214 |

OTHER PUBLICATIONS

The IP.com Prior Art Database https://ip.com/IPCOM/000244805 (Year: 2016).*

(Continued)

*Primary Examiner* — Bruce I Ebersman
(74) *Attorney, Agent, or Firm* — GREENBLUM & BERNSTEIN, P.L.C.

(57) ABSTRACT

A method and a system for detecting suspicious transactions and providing warnings in advance of executing the transactions in order to prevent fraud are provided. The method includes: receiving a request to conduct a transaction with an entity by using a digital payment application, the request including first profile information that relates to the entity; retrieving second profile information that relates to the requestor; comparing the first profile information with the second profile information; and determining, based on a result of the comparison, whether to suspend the requested transaction. When a determination is made that the proposed transaction may be fraudulent, the transaction may be suspended and a warning message may be sent to the requestor in order to afford an opportunity to avoid the fraud.

9 Claims, 5 Drawing Sheets

(56) References Cited

OTHER PUBLICATIONS

Transaction Management for M-Commerce at a Mobile Terminal Jari Veijalainen1, Vagan Terziyan2, Henry Tirri (Year: 2003).*
Leveraging Cellular Infrastructure to Improve Fraud Prevention IEEE 2009 (Year: 2009).*
A Method of Fraud & Intrusion Detection for E-payment Systems in Mobile e-Commerce, IIIE 2007 (Year: 2007).*

* cited by examiner

| | PREDICTED | |
|---|---|---|
| ACTUAL | Positive | Negative |
| Positive | True Positive (TP) | False Negative (FN) |
| Negative | False Positive (FP) | True Negative (TN) |

500

$$Precision = \frac{TP}{TP+FP}$$

$$Recall = \frac{TP}{TP+FN}$$

$$F1\ Score = \frac{2 * Precision * Recall}{Precision + Recall}$$

FIG. 5

METHOD AND SYSTEM FOR FRAUD PREVENTION

BACKGROUND

1. Field of the Disclosure

This technology generally relates to methods and systems for preventing fraud, and more particularly to methods and systems for detecting suspicious transactions and providing warnings in advance of executing the transactions in order to prevent fraud.

2. Background Information

Financial institutions provide applications, such as Zelle and Venmo, that facilitate the digital execution of a transaction in a relatively quick and easy manner. These applications enable a customer to send money and/or receive money with virtually no delay and no transaction cost.

When using a quick digital payment application, a customer may targeted by a fraudster into unintentionally transferring money from the customer's account into an account controlled by the fraudster. The fraudster deceives the customer by falsely asserting that the customer's account has been hacked and using the false alarm to induce the customer to conduct a transaction that the customer falsely believes is required to recover.

A typical fraud scenario may entail the following sequence of events: First, the fraudster registers a telephone number or email address of a target to a financial account that is controlled by the fraudster. The fraudster then sends a text message or an email message to the target to notify the target that a payment of some amount has been sent from the target's account at Bank 1 to another account at Bank 2, and then invites the target to receive a call from "the fraud department" at Bank 1. When the target responds by indicating that yes, a call would be welcome, the fraudster calls from a spoofed number that appears to have been originated from Bank 1.

The fraudster informs the target that in order to assist the target in recovering the money that has been sent, a new token for a digital payment application will need to be set up, and thus induces the target to set up the new token. The fraudster then explains that in order to recover the money, the target must send that amount to his/her own email address—noting that this email address is an unregistered token—and then prompts the target to proceed with this money transfer.

The money that has now been transferred is removed from the target's account at Bank 1, pending delivery to the unregistered token associated with the target's email address. The fraudster then enrolls in the digital payment application using the target's email address as a token for the fraudster's account at Bank 2. Bank 2 then sends a one-time personal identification number (PIN) to the target's email address to confirm ownership. The fraudster then informs the target that the funds have been successfully recovered, but that the one-time PIN will be required, and asks the target to provide the one-time PIN from the email message that the target has now received.

When the target provides the one-time PIN to the fraudster, the fraudster completes the enrollment in the digital payment application, and the transferred funds are then deposited into the fraudster's account at Bank 2. After receiving the funds, the fraudster unregisters the token associated with the target's email address from the digital payment application profile at Bank 2, and the fraud is now complete.

Although this type of fraud is facilitated by the fact that the target is deceived into cooperating with the fraudster, many financial institutions have policies by which the lost funds are refunded to the target account, at the expense of the financial institution. Accordingly, there is a need for a method for detecting suspicious transactions and providing warnings in advance of executing the transactions in order to prevent fraud.

SUMMARY

The present disclosure, through one or more of its various aspects, embodiments, and/or specific features or sub-components, provides, inter alia, various systems, servers, devices, methods, media, programs, and platforms for detecting suspicious transactions and providing warnings in advance of executing the transactions in order to prevent fraud.

According to an aspect of the present disclosure, a method for detecting a fraudulent transaction is provided. The method is implemented by at least one processor. The method includes: receiving, by the at least one processor from a requestor, a request to conduct a transaction with an entity by using a digital payment application, the request including first profile information that relates to the entity and transaction-specific information that relates to the requested transaction; retrieving, by the at least one processor from a memory, second profile information that relates to the requestor; comparing, by the at least one processor, the first profile information with the second profile information; and determining, by the processor based on a result of the comparing, whether to suspend the requested transaction.

When the result of the comparing indicates that a subset of the first profile information matches with a subset of the second profile information, the method may further include facilitating an execution of the requested transaction.

When the result of the comparing indicates that a subset of the first profile information does not match a subset of the second profile information, the method may further include suspending the requested transaction and transmitting a warning message to the requestor.

The first profile information may include at least one from among a name of the entity, an email address associated with the entity, and a telephone number associated with the entity.

The second profile information may include at least one from among a name of the requestor, a home address associated with the requestor, an email address associated with the requestor, and a telephone number associated with the requestor.

The method may further include applying an artificial intelligence (AI) algorithm that uses a machine learning technique to perform the determining of whether to suspend the requested transaction.

The AI algorithm may use the transaction-specific information, the first profile information, and the second profile information as inputs, and may generate, as an output, one from among a prediction that the requested transaction is a fraudulent transaction and a prediction that the requested transaction is a non-fraudulent transaction.

The method may further include generating a metric that indicates a level of an ability of the AI algorithm to accurately predict fraudulent transactions.

The metric may include at least one from among a first metric that relates to a precision of the AI algorithm, a second metric that relates to a recall of the AI algorithm, a third metric that relates to an accuracy of the AI algorithm, a fourth metric that relates to an F1 score of the AI algorithm, and a fifth metric that relates to an area under a receiver operating characteristic (ROC) curve (AUC) associated with the AI algorithm.

According to another exemplary embodiment, a computing apparatus for detecting a fraudulent transaction is provided. The computing apparatus includes a processor; a memory; and a communication interface coupled to each of the processor and the memory. The processor is configured to: receive, via the communication interface from a requestor, a request to conduct a transaction with an entity by using a digital payment application, the request including first profile information that relates to the entity and transaction-specific information that relates to the requested transaction; retrieve, from the memory, second profile information that relates to the requestor; compare the first profile information with the second profile information; and determine, based on a result of the comparison, whether to suspend the requested transaction.

When the result of the comparison indicates that a subset of the first profile information matches with a subset of the second profile information, the processor may be further configured to facilitate an execution of the requested transaction.

When the result of the comparison indicates that a subset of the first profile information does not match a subset of the second profile information, the processor may be further configured to: suspend the requested transaction; and transmit, via the communication interface, a warning message to the requestor.

The first profile information may include at least one from among a name of the entity, an email address associated with the entity, and a telephone number associated with the entity.

The second profile information may include at least one from among a name of the requestor, a home address associated with the requestor, an email address associated with the requestor, and a telephone number associated with the requestor.

The processor may be further configured to apply an artificial intelligence (AI) algorithm that uses a machine learning technique to perform the determination of whether to suspend the requested transaction.

The AI algorithm may use the transaction-specific information, the first profile information, and the second profile information as inputs, and may generate, as an output, one from among a prediction that the requested transaction is a fraudulent transaction and a prediction that the requested transaction is a non-fraudulent transaction.

The processor may be further configured to generate a metric that indicates a level of an ability of the AI algorithm to accurately predict fraudulent transactions.

The metric may include at least one from among a first metric that relates to a precision of the AI algorithm, a second metric that relates to a recall of the AI algorithm, a third metric that relates to an accuracy of the AI algorithm, a fourth metric that relates to an F1 score of the AI algorithm, and a fifth metric that relates to an area under a receiver operating characteristic (ROC) curve (AUC) associated with the AI algorithm.

According to yet another exemplary embodiment, a non-transitory computer readable storage medium storing instructions for detecting a fraudulent transaction is provided. The storage medium includes executable code which, when executed by a processor, causes the processor to: receive, from a requestor, a request to conduct a transaction with an entity by using a digital payment application, the request including first profile information that relates to the entity and transaction-specific information that relates to the requested transaction; retrieve, from a memory, second profile information that relates to the requestor; compare the first profile information with the second profile information; and determine, based on a result of the comparison, whether to suspend the requested transaction.

When the result of the comparison indicates that a subset of the first profile information does not match a subset of the second profile information, the executable code may further cause the processor to suspend the requested transaction and to transmit a warning message to the requestor.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 5 is a diagram that illustrates various performance metrics that provide an indication of an ability of a model to accurately predict fraudulent transactions, according to an exemplary embodiment.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
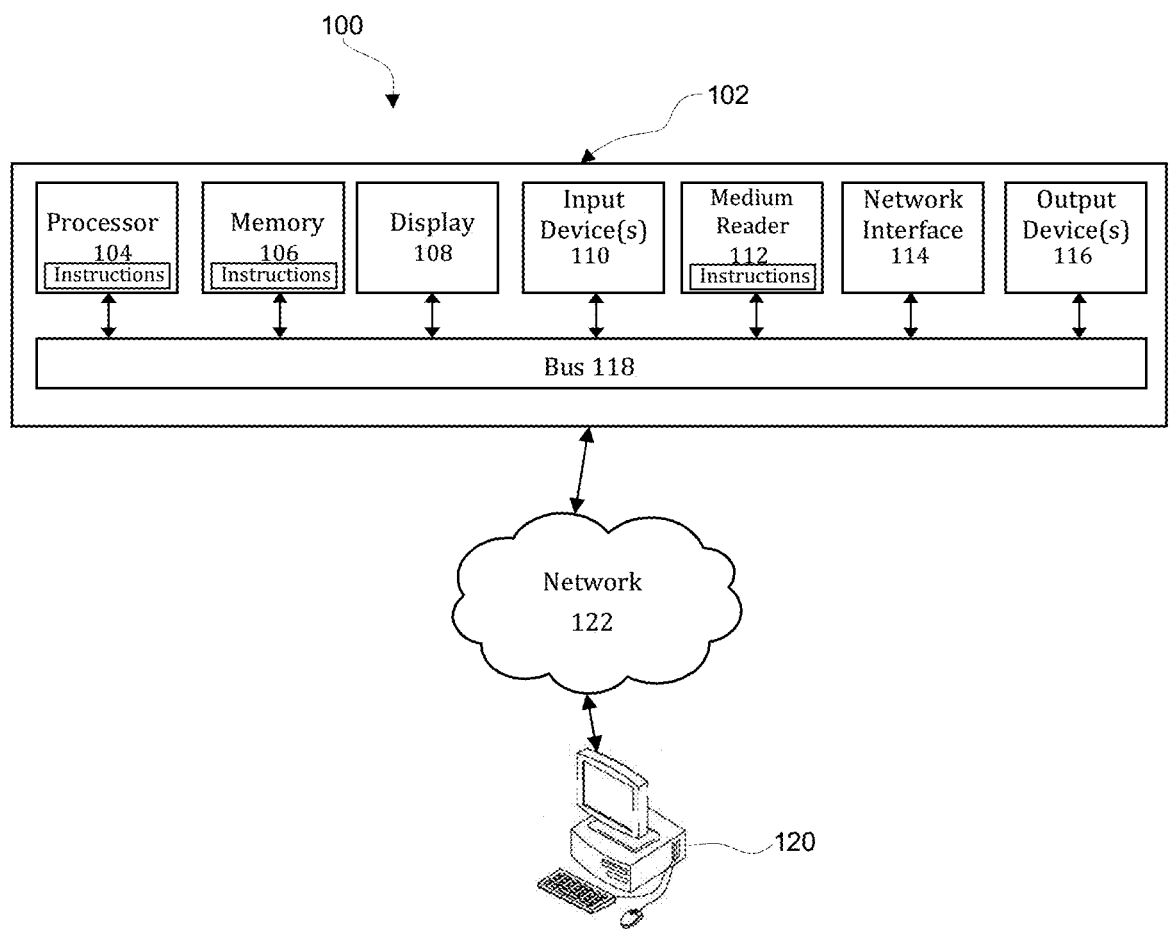
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for detecting suspicious transactions and providing warnings in advance of executing the transactions in order to prevent fraud.

Figure 2:
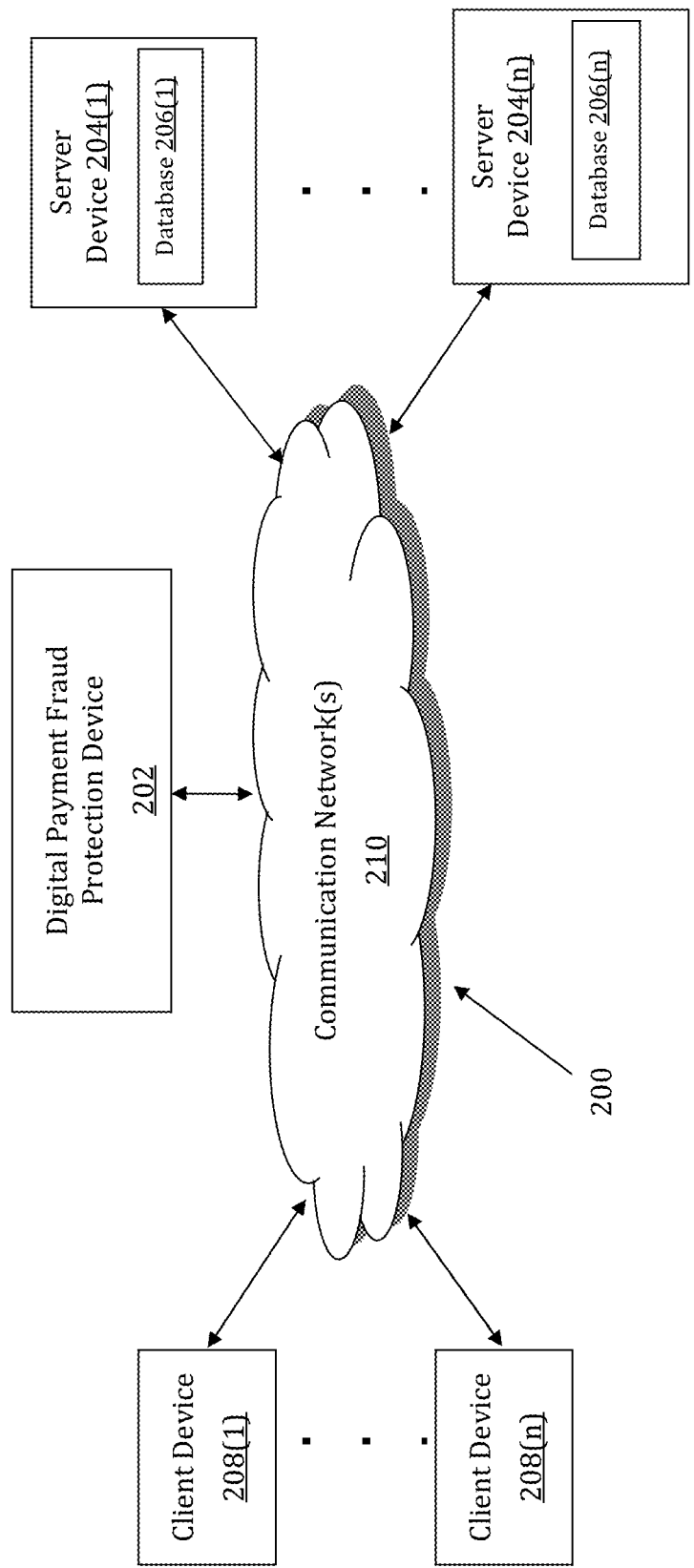
FIG. 2 illustrates an exemplary diagram of a network environment.

Referring to FIG. 2, a schematic of an exemplary network environment 200 for implementing a method for detecting suspicious transactions and providing warnings in advance of executing the transactions in order to prevent fraud is illustrated. In an exemplary embodiment, the method is executable on any networked computer platform, such as, for example, a personal computer (PC).

The method for detecting suspicious transactions and providing warnings in advance of executing the transactions in order to prevent fraud may be implemented by a Digital Payment Fraud Protection (DPFP) device 202. The DPFP device 202 may be the same or similar to the computer system 102 as described with respect to FIG. 1. The DPFP device 202 may store one or more applications that can include executable instructions that, when executed by the DPFP device 202, cause the DPFP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DPFP device 202 itself, may be located in virtual server(s) running in a cloud-based computing environment rather than being tied to one or more specific physical network computing devices. Also, the application(s) may be running in one or more virtual machines (VMs) executing on the DPFP device 202. Additionally, in one or more embodiments of this technology, virtual machine(s) running on the DPFP device 202 may be managed or supervised by a hypervisor.

In the network environment 200 of FIG. 2, the DPFP device 202 is coupled to a plurality of server devices 204(1)-204(n) that hosts a plurality of databases 206(1)-206(n), and also to a plurality of client devices 208(1)-208(n) via communication network(s) 210. A communication interface of the DPFP device 202, such as the network interface 114 of the computer system 102 of FIG. 1, operatively couples and communicates between the DPFP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DPFP device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DPFP devices that efficiently implement a method for detecting suspicious transactions and providing warnings in advance of executing the transactions in order to prevent fraud.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DPFP device 202 may be a standalone device or integrated with one or more other devices or apparatuses, such as one or more of the server devices 204(1)-204(n), for example. In one particular example, the DPFP device 202 may include or be hosted by one of the server devices 204(1)-204(n), and other arrangements are also possible. Moreover, one or more of the devices of the DPFP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DPFP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store information that relates to customer-specific account profiles and information that relates to fraud prevention model performance metrics.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DPFP device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DPFP device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DPFP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DPFP device 202, the server devices 204(1)-204(n), or the client devices 208(1)-208(n), for example, may be configured to operate as virtual instances on the same physical machine. In other words, one or more of the DPFP device 202, the server devices 204(1)-204(n), or the client devices 208(1)-208(n) may operate on the same physical device rather than as separate devices communicating through communication network(s) 210. Additionally, there may be more or fewer DPFP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
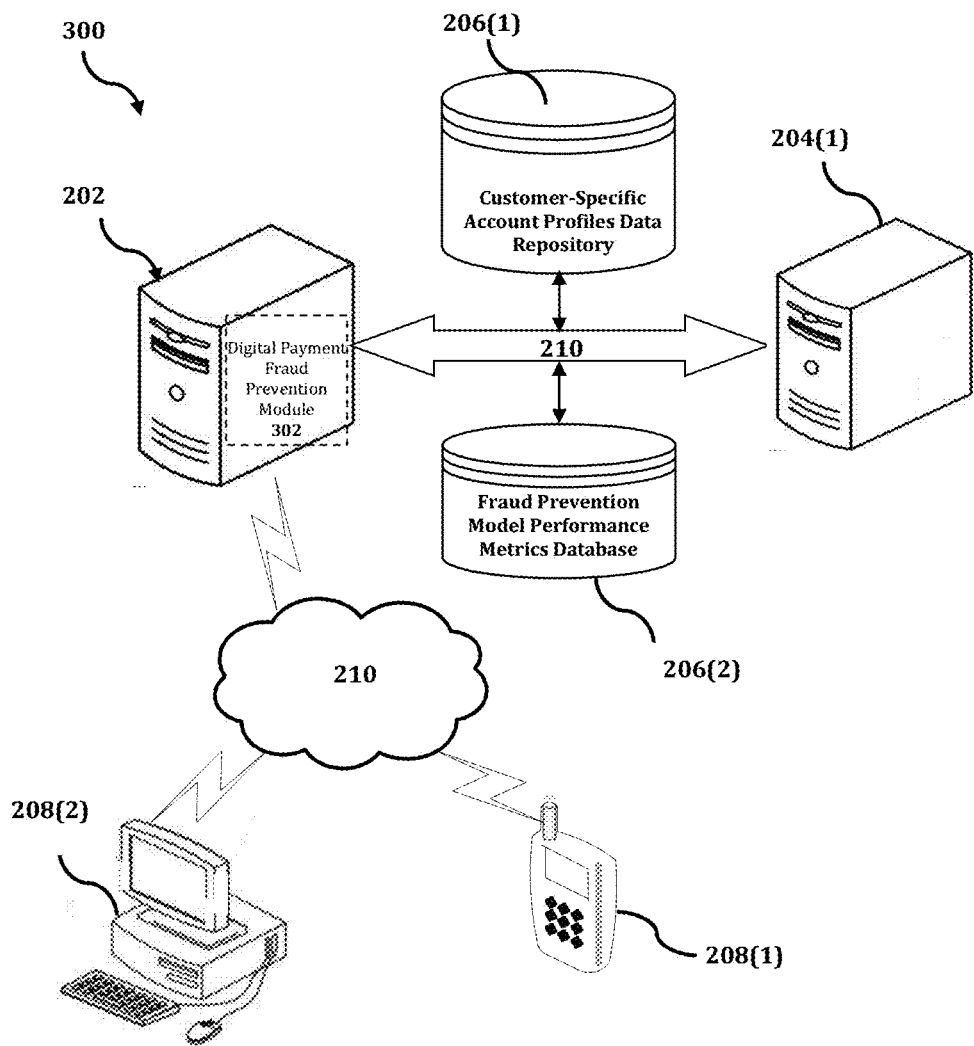
FIG. 3 shows an exemplary system for implementing a method for detecting suspicious transactions and providing warnings in advance of executing the transactions in order to prevent fraud.

The DPFP device 202 is described and illustrated in FIG. 3 as including a digital payment fraud prevention module 302, although it may include other rules, policies, modules, databases, or applications, for example. As will be described below, the digital payment fraud prevention module 302 is configured to implement a method for detecting suspicious transactions and providing warnings in advance of executing the transactions in order to prevent fraud.

An exemplary process 300 for implementing a mechanism for detecting suspicious transactions and providing warnings in advance of executing the transactions in order to prevent fraud by utilizing the network environment of FIG. 2 is illustrated as being executed in FIG. 3. Specifically, a first client device 208(1) and a second client device 208(2) are illustrated as being in communication with DPFP device 202. In this regard, the first client device 208(1) and the second client device 208(2) may be "clients" of the DPFP device 202 and are described herein as such. Nevertheless, it is to be known and understood that the first client device 208(1) and/or the second client device 208(2) need not necessarily be "clients" of the DPFP device 202, or any entity described in association therewith herein. Any additional or alternative relationship may exist between either or both of the first client device 208(1) and the second client device 208(2) and the DPFP device 202, or no relationship may exist.

Further, DPFP device 202 is illustrated as being able to access a customer-specific account profiles data repository 206(1) and a fraud prevention model performance metrics database 206(2). The digital payment fraud prevention module 302 may be configured to access these databases for implementing a method for detecting suspicious transactions and providing warnings in advance of executing the transactions in order to prevent fraud.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DPFP device 202 via broadband or cellular communication. Of course, these embodiments are merely exemplary and are not limiting or exhaustive.

Upon being started, the digital payment fraud prevention module 302 executes a process for detecting suspicious transactions and providing warnings in advance of executing the transactions in order to prevent fraud. An exemplary process for detecting suspicious transactions and providing warnings in advance of executing the transactions in order to prevent fraud is generally indicated at flowchart 400 in FIG. 4.

Figure 4:
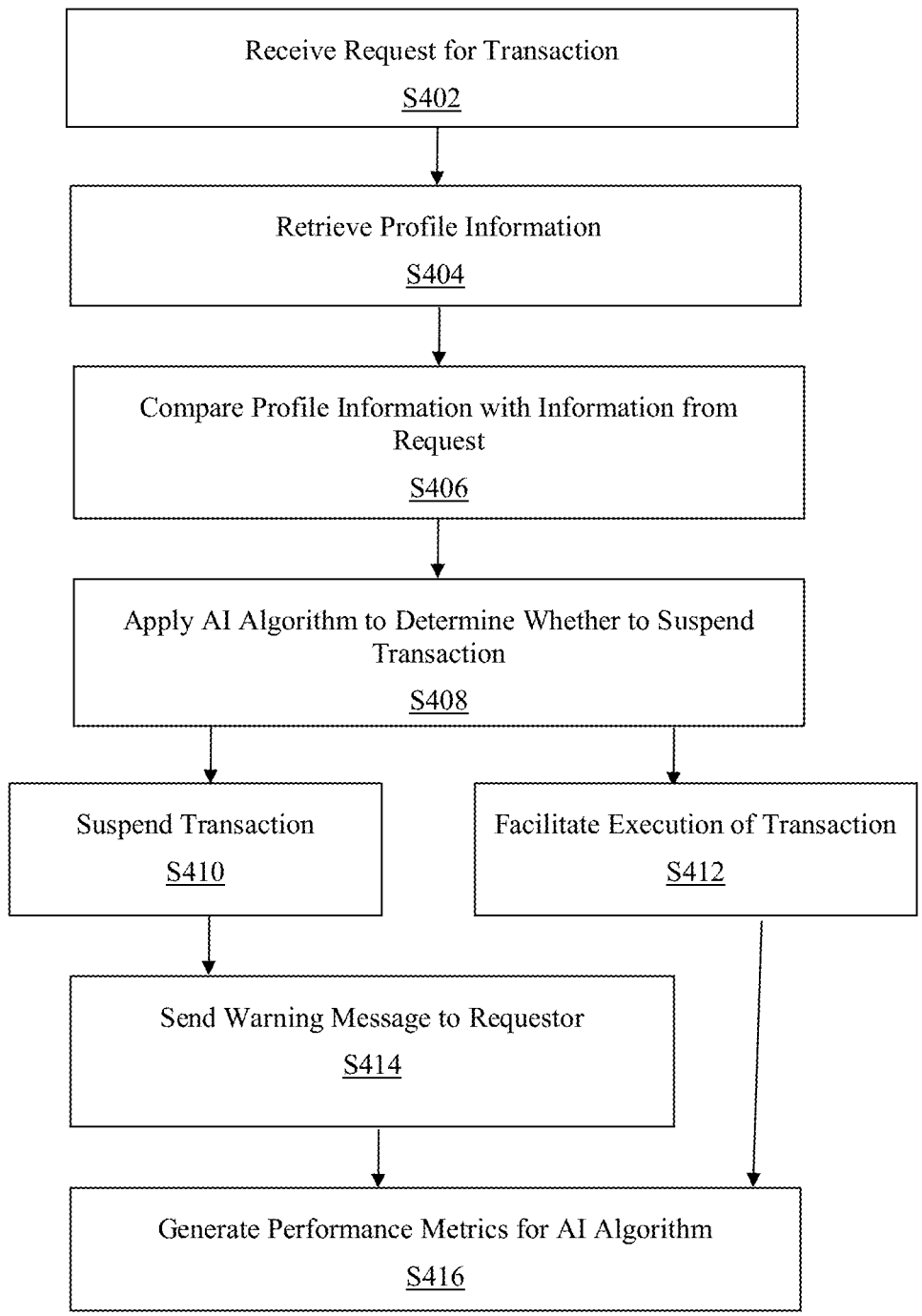
FIG. 4 is a flowchart of an exemplary process for implementing a method for detecting suspicious transactions and providing warnings in advance of executing the transactions in order to prevent fraud.

In process 400 of FIG. 4, at step S402, the digital payment fraud prevention module 302 receives a request to conduct a transaction by using a digital payment application, such as, for example, Zelle or Venmo. The request is received from a requestor, i.e., a person that owns an account that is administered by a bank or financial institution. The request includes transaction-specific information, such as, for example, an amount of money to be transferred and an identifier of an entity to which the money is to be transferred (also referred to herein as a "recipient"). The identifier may include profile information that relates to the recipient, such as, for example, a name of the recipient, an email address associated with the recipient, a telephone number associated with the recipient, and/or any other suitable type of information that is associated with the entity/recipient.

At step S404, the digital payment fraud prevention module 302 retrieves profile information that relates to the requestor. In an exemplary embodiment, the profile information that relates to the requestor is obtained by the bank or financial institution at the time of the opening of the account that is associated with the requestor, and is then stored in a database or a memory. The profile information that relates to the requestor may include, for example, any one or more of a name of the requestor, a home address associated with the requestor, an email address associated with the requestor, a telephone number associated with the requestor, login information associated with the requestor such as user name and/or password, and/or any other suitable type of information that is associated with the requestor.

At step S406, the digital payment fraud prevention module 302 compares the profile information associated with the requestor retrieved in step S404 with the information received in step S402. Then, at step S408, the digital payment fraud prevention module 302 uses a result of the comparison to determine whether to suspend the requested transaction. In an exemplary embodiment, the determination of whether to suspend the requested transaction is based on whether there is a match between corresponding portions of the profile information associated with the recipient and the profile information associated with the requestor. For example, when the email addresses of both sets of profile information are the same but the name of the recipient is different from the name of the requestor, this mismatch may be interpreted as indicating a possible fraud, because a fraudster may have associated the email address of the requestor with the fraudster's own name in order to deceive the requestor into a false belief that the funds are being transferred to him/herself.

In an exemplary embodiment, the determination of whether to suspend the transaction is performed by applying an artificial intelligence (AI) algorithm that uses a machine learning technique to make the determination. The AI algorithm uses the transaction-specific information, the profile information associated with the recipient, and the profile information associated with the requestor as inputs, and generates, as an output, either a prediction that the requested transaction is a fraudulent transaction or a prediction that the requested transaction is a non-fraudulent transaction. In an exemplary embodiment, the AI algorithm uses at least one of a classification model and an artificial neural network (ANN) model, and the models are continuously monitored and subjected to performance quality analysis. In an exemplary embodiment, the model outputs are used for continuous retraining of the models for improved accuracy, with a goal of 100% accuracy in detecting fraudulent transactions while recognizing non-fraudulent transactions.

When a determination is made at step S408 that the requested transaction is to be suspended, then at step S410, the digital payment fraud prevention module 302 suspends the transaction. Alternatively, when a determination is made at step S408 that the requested transaction is to be executed, then at step S412, the digital payment fraud prevention module 302 facilitates an execution of the transaction.

At step S414, after the transaction has been suspended, the digital payment fraud prevention module 302 generates and transmits a warning message to the requestor, in order to notify the requestor that a possible fraud may be imminent. In this aspect, in a situation where the requestor may have been deceived by a fraudster, the warning message may enable the requestor to recognize the deceptive nature of the actions that have occurred and to decide to avoid incurring a loss that would otherwise result from completing the requested transaction. In an exemplary embodiment, the warning message may be sent in the form of an email message and/or a text message that is displayable on a smart phone of the requestor, so that the requestor is immediately able to view the warning message.

The warning message may include profile information associated with the recipient, such as one or more of an email address, a telephone number, and/or a name of the recipient, and thus, if the requestor has been deceived into believing that the transfer is being made to the requestor's own email address or telephone number but a different name is shown, then the requestor may be able to recognize that a fraud is being attempted. The warning message may also include a caution, such as: "Make sure this looks right to you, and only send money to people and businesses you trust"; and the warning message may also include a reminder, such as: "Remember, we'll never call or text you asking you to transfer money, even to yourself." Such warnings may also assist the requestor in recognizing an ongoing attempt at fraud.

At step S416, regardless of whether the transaction has been suspended or executed, the digital payment fraud prevention module 302 generates performance metrics with respect to the AI algorithm, as indicators of a level of an ability of the AI algorithm to accurately predict fraudulent transactions. In an exemplary embodiment, the metrics may include any one or more of the following: a first metric that relates to a precision of the AI algorithm; a second metric that relates to a recall of the AI algorithm; a third metric that relates to an accuracy of the AI algorithm; a fourth metric that relates to an F1 score of the AI algorithm; and a fifth metric that relates to an area under a receiver operating characteristic (ROC) curve (AUC) associated with the AI algorithm.

FIG. 5 is a diagram 500 that illustrates various performance metrics that provide an indication of an ability of a model to accurately predict fraudulent transactions, according to an exemplary embodiment. As shown in diagram 500, a transaction may be positively predicted as a fraudulent transaction or negatively predicted as a non-fraudulent transaction, and the transaction may actually be fraudulent or non-fraudulent, and as a result, there are four measures of accuracy: True Positive (TP) is a percentage of fraudulent transactions that are correctly predicted by the model as being fraudulent; False Positive (FP) is a percentage of non-fraudulent transactions that are incorrectly predicted by the model as being fraudulent; False Negative (FN) is a percentage of fraudulent transactions that are incorrectly predicted by the model as being non-fraudulent; and True Negative (TN) is a percentage of non-fraudulent transactions that are correctly predicted by the model as being non-fraudulent.

Referring again to FIG. 5, the precision metric may be measured by dividing the TP parameter by the sum of TP and FP, and the recall metric may be measured by diving the TP parameter by the sum of TP and FN. The formula for the F1 score is also shown; it is expressible as a fraction, with the denominator equal to the sum of the precision metric and the recall metric, and the numerator equal to double the product of the precision metric and the recall metric.

Accordingly, with this technology, an optimized process for detecting suspicious transactions and providing warnings in advance of executing the transactions in order to prevent fraud is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for detecting a fraudulent transaction, the method being implemented by at least one processor, the method comprising:
   receiving, by the at least one processor from a requestor, a request to conduct a transaction with an entity by using a digital payment application, the request including first profile information that relates to the entity and transaction-specific information that relates to the requested transaction;
   retrieving, by the at least one processor from a memory, second profile information that relates to the requestor;
   comparing, by the at least one processor, the first profile information with the second profile information; and
   determining, by the processor based on a result of the comparing, whether to suspend the requested transaction,
   wherein when the result of the comparing indicates that a subset of the first profile information does not match a subset of the second profile information, the method further comprises:
   suspending the requested transaction; and
   transmitting a warning message to the requestor,
   wherein the warning message includes the subset of the first profile information and at least one from among a caution that relates to the subset of the first profile information and a reminder that relates to the requested transaction, and
   wherein the method further comprises:
   applying an artificial intelligence (AI) algorithm that uses a machine learning technique to perform the determining of whether to suspend the requested transaction, wherein the AI algorithm uses the transaction-specific information, the first profile information, and the second profile information as inputs, and generates, as an output, one from among a prediction that the requested transaction is a fraudulent transaction and a prediction that the requested transaction is a non-fraudulent transaction; and
   generating a metric that indicates a level of an ability of the AI algorithm to accurately predict fraudulent transactions, wherein the metric includes at least one from among a first metric that relates to a precision of the AI algorithm, a second metric that relates to a recall of the AI algorithm, a third metric that relates to an accuracy of the AI algorithm, a fourth metric that relates to an F1 score of the AI algorithm, and a fifth metric that relates to an area under a receiver operating characteristic (ROC) curve (AUC) associated with the AI algorithm.

2. The method of claim 1, wherein when the result of the comparing indicates that a subset of the first profile information matches with a subset of the second profile information, the method further comprises facilitating an execution of the requested transaction.

3. The method of claim 1, wherein the first profile information includes at least one from among a name of the entity, an email address associated with the entity, and a telephone number associated with the entity.

4. The method of claim 1, wherein the second profile information includes at least one from among a name of the requestor, a home address associated with the requestor, an email address associated with the requestor, and a telephone number associated with the requestor.

5. A computing apparatus for detecting a fraudulent transaction, the computing apparatus comprising:
   a processor;
   a memory; and
   a communication interface coupled to each of the processor and the memory,
   wherein the processor is configured to:
   receive, via the communication interface from a requestor, a request to conduct a transaction with an entity by using a digital payment application, the request including first profile information that relates to the entity and transaction-specific information that relates to the requested transaction;
   retrieve, from the memory, second profile information that relates to the requestor;
   compare the first profile information with the second profile information; and
   determine, based on a result of the comparison, whether to suspend the requested transaction,
   wherein when the result of the comparison indicates that a subset of the first profile information does not match a subset of the second profile information, the processor is further configured to:
   suspend the requested transaction; and
   transmit a warning message to the requestor,
   wherein the warning message includes the subset of the first profile information and at least one from among a caution that relates to the subset of the first profile information and a reminder that relates to the requested transaction, and
   wherein the processor is further configured to:
   apply an artificial intelligence (AI) algorithm that uses a machine learning technique to perform the determination of whether to suspend the requested transaction, wherein the AI algorithm uses the transaction-specific information, the first profile information, and the second profile information as inputs, and generates, as an output, one from among a prediction that the requested transaction is a fraudulent transaction and a prediction that the requested transaction is a non-fraudulent transaction; and
   generate a metric that indicates a level of an ability of the AI algorithm to accurately predict fraudulent transactions, wherein the metric includes at least one from among a first metric that relates to a precision of the AI algorithm, a second metric that relates to a recall of the AI algorithm, a third metric that relates to an accuracy of the AI algorithm, a fourth metric that relates to an F1 score of the AI algorithm, and a fifth metric that relates to an area under a receiver operating characteristic (ROC) curve (AUC) associated with the AI algorithm.

6. The computing apparatus of claim 5, wherein when the result of the comparison indicates that a subset of the first profile information matches with a subset of the second profile information, the processor is further configured to facilitate an execution of the requested transaction.

7. The computing apparatus of claim 5, wherein the first profile information includes at least one from among a name of the entity, an email address associated with the entity, and a telephone number associated with the entity.

8. The computing apparatus of claim 5, wherein the second profile information includes at least one from among a name of the requestor, a home address associated with the requestor, an email address associated with the requestor, and a telephone number associated with the requestor.

9. A non-transitory computer readable storage medium storing instructions for detecting a fraudulent transaction, the storage medium comprising executable code which, when executed by a processor, causes the processor to:

receive, from a requestor, a request to conduct a transaction with an entity by using a digital payment application, the request including first profile information that relates to the entity and transaction-specific information that relates to the requested transaction;

retrieve, from a memory, second profile information that relates to the requestor;

compare the first profile information with the second profile information; and determine, based on a result of the comparison, whether to suspend the requested transaction, wherein when the result of the comparison indicates that a subset of the first profile information does not match a subset of the second profile information, the executable code further causes the processor to:

suspend the requested transaction; and transmit a warning message to the requestor, wherein the warning message includes the subset of the first profile information and at least one from among a caution that relates to the subset of the first profile information and a reminder that relates to the requested transaction, and wherein the executable code further causes the processor to:

apply an artificial intelligence (AI) algorithm that uses a machine learning technique to perform the determination of whether to suspend the requested transaction, wherein the AI algorithm uses the transaction-specific information, the first profile information, and the second profile information as inputs, and generates, as an output, one from among a prediction that the requested transaction is a fraudulent transaction and a prediction that the requested transaction is a non-fraudulent transaction; and generate a metric that indicates a level of an ability of the AI algorithm to accurately predict fraudulent transactions, wherein the metric includes at least one from among a first metric that relates to a precision of the AI algorithm, a second metric that relates to a recall of the AI algorithm, a third metric that relates to an accuracy of the AI algorithm, a fourth metric that relates to an F1 score of the AI algorithm, and a fifth metric that relates to an area under a receiver operating characteristic (ROC) curve (AUC) associated with the AI algorithm.

* * * * *